Dec. 5, 1950   M. C. ROBINSON   2,532,945
CONTROL FOR MOTOR VEHICLE TRANSMISSIONS
Filed Sept. 21, 1946   4 Sheets-Sheet 2

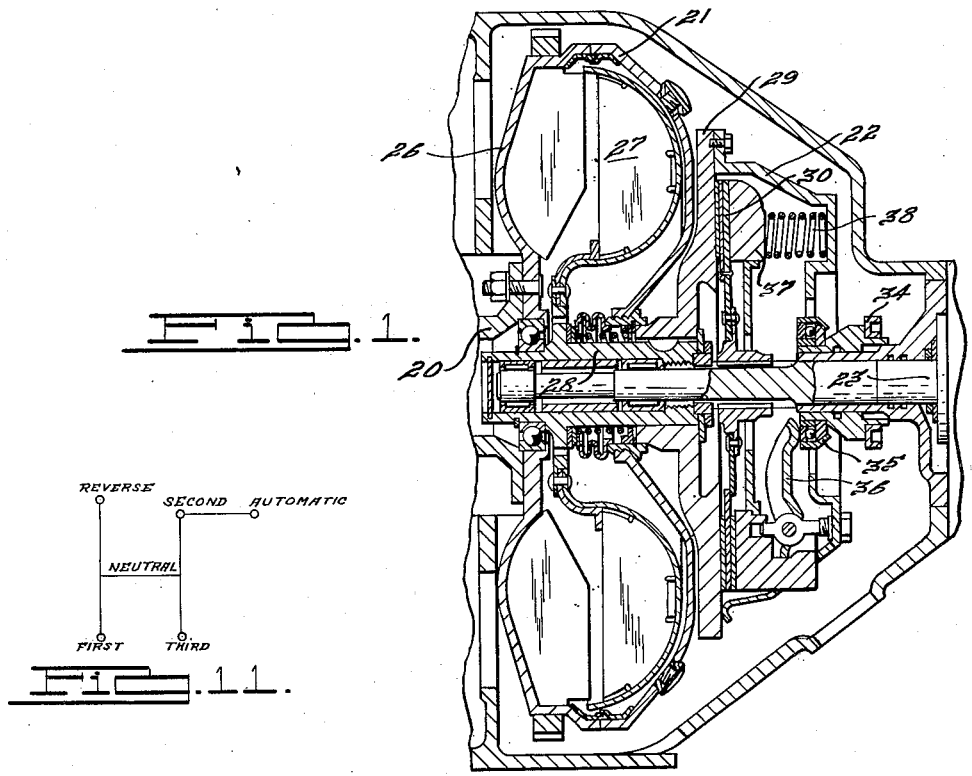
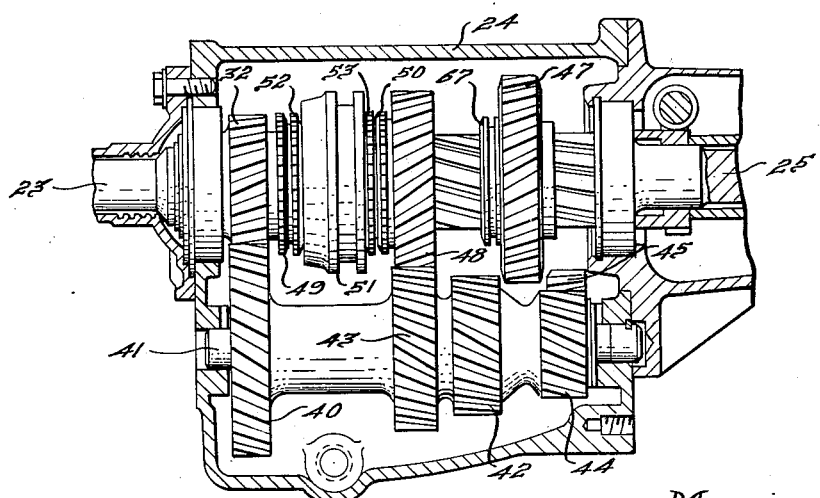

INVENTOR.
Maurice C. Robinson.
BY
Harness and Harris
ATTORNEYS.

Dec. 5, 1950  M. C. ROBINSON  2,532,945
CONTROL FOR MOTOR VEHICLE TRANSMISSIONS
Filed Sept. 21, 1946  4 Sheets-Sheet 3
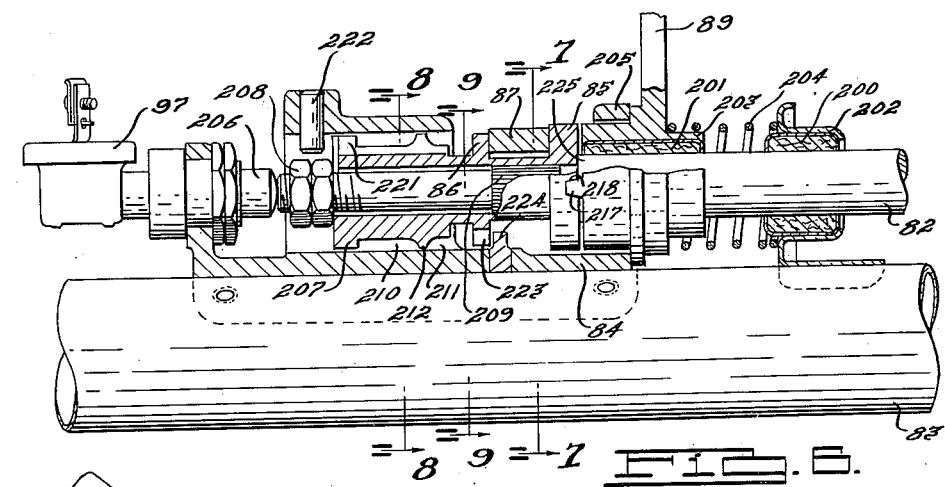
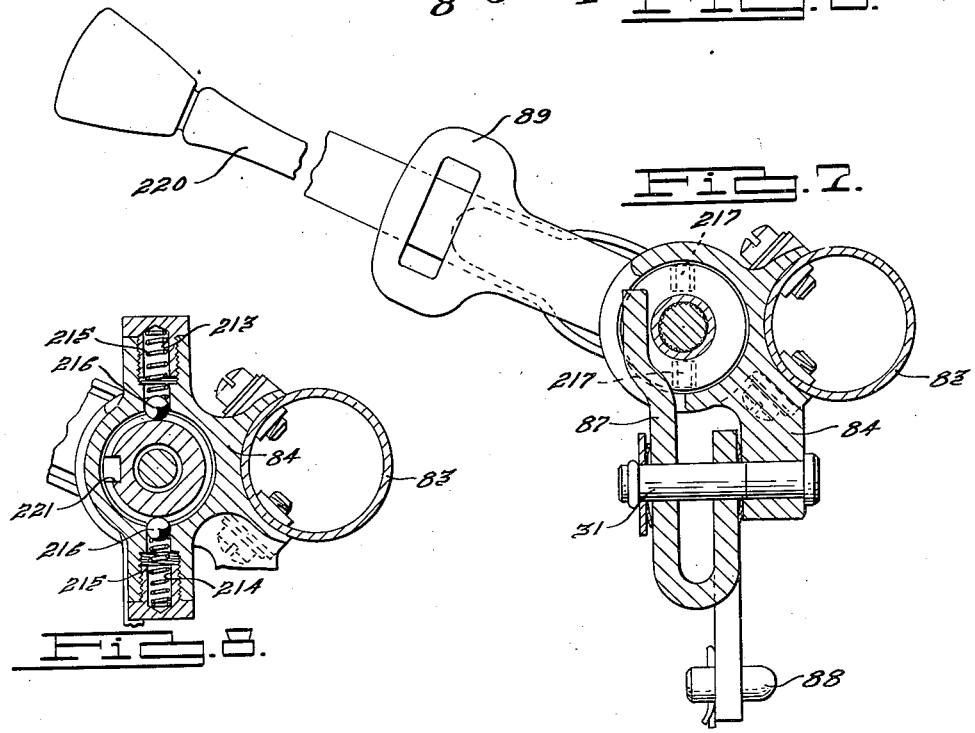
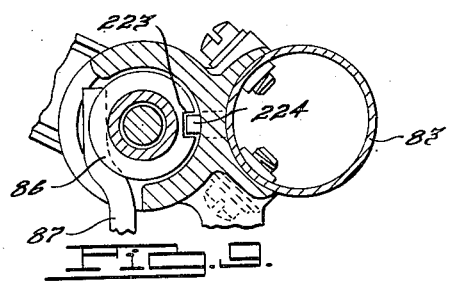
INVENTOR.
Maurice C. Robinson
BY
Harness and Harris
ATTORNEYS.

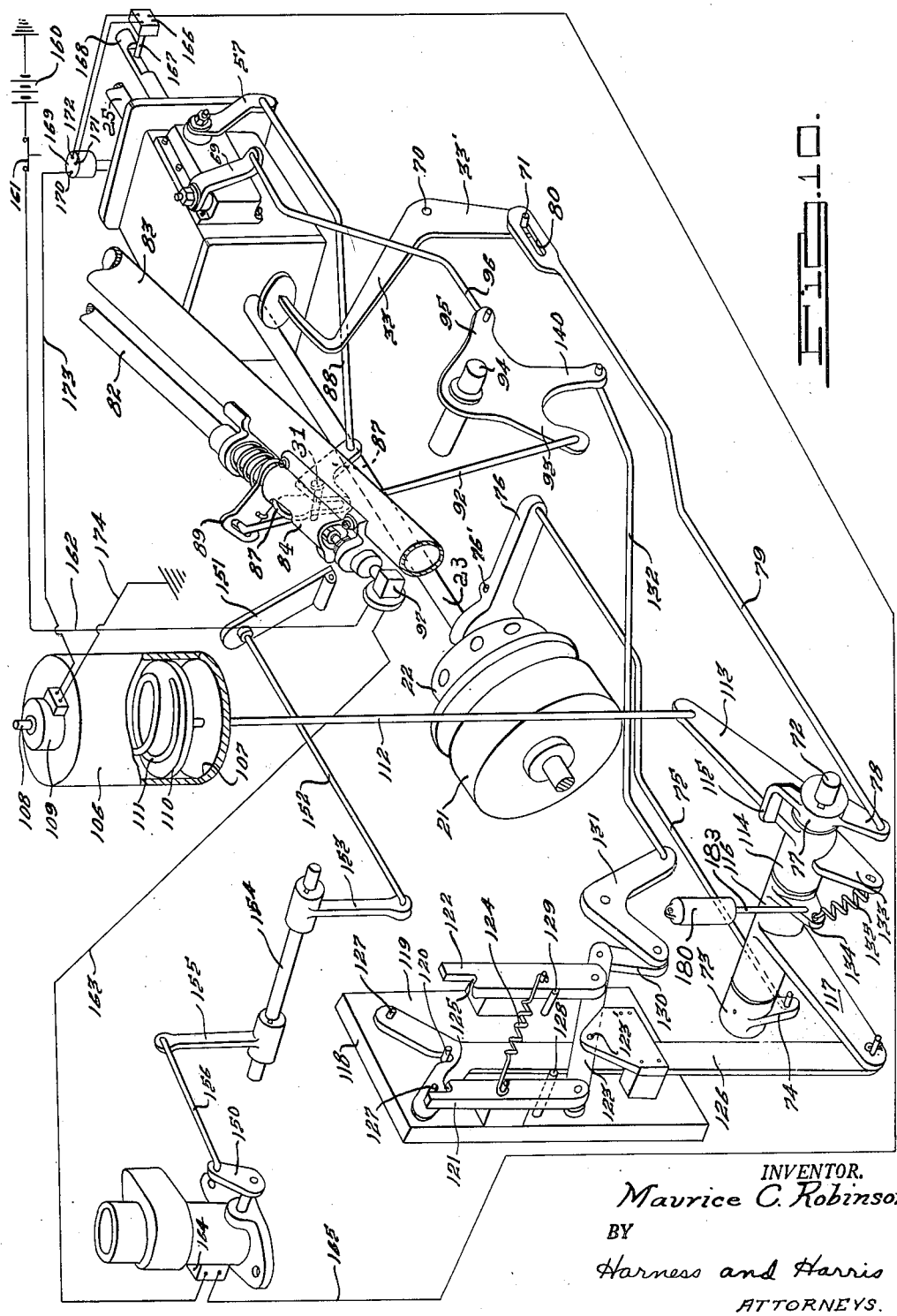

Patented Dec. 5, 1950

2,532,945

UNITED STATES PATENT OFFICE 2,532,945

CONTROL FOR MOTOR VEHICLE TRANSMISSIONS

Maurice C. Robinson, Royal Oak, Mich., assignor to Chrysler Corporation, Highland Park, Mich., a corporation of Delaware Application September 21, 1946, Serial No. 698,504

3 Claims. (Cl. 74—335)

This invention relates to automotive vehicle transmission controls and more particularly to the combination of automatic means for changing the speed ratio drive of the transmission with manual means for changing the speed ratio drive and means to select between the automatic means and the manual means.

Apparatuses for automatically controlling the speed ratio drives in motor vehicle transmissions have been developed. These apparatuses usually initiate a cycle including a clutch disengagement, a change in transmission speed ratio drive and a clutch reengagement. In many cases it is desirable to retain the conventional manual shift control lever and rod and means are provided herein to give the driver a selection as to whether the automatic control or the manual control will be operative.

The selecting means to be described herein is associated with the manual shift control rod and permits the driver to operatively disconnect the shift control rod from the linkage to be actuated by the automatic control system and takes advantage of the fact that the automatic control system is dependent upon electrical current to provide the driver with means to interrupt the electrical circuit.

My invention provides means by which a transmission and control lever employing the conventional H pattern for manual shifting are adapted to utilize an auxiliary movement of the shift lever to actuate an automatic control system.

It is an object of this invention to selectively move a single transmission control element either by automatic means or by manual means.

The invention will be described herein in conjunction with a suggested transmission and clutch control apparatus as a typical application thereof although it is not intended that the invention be limited to the associated apparatus described therein.

In the drawings:

Fig. 1 is a longitudinal sectional elevation through the main clutch mechanism;

Fig. 2 is a vertical section of a transmission;

Fig. 6 is a plan view partly in section of the selector apparatus on the lower portion of the manual shift control rod;

Fig. 7 is a view taken on the line 7—7 of Fig. 6;

Fig. 8 is a view taken on the line 8—8 of Fig. 6;

Fig. 9 is a view taken on the line 9—9 of Fig. 6;

Fig. 10 is a diagrammatic view of a transmission and clutch control apparatus of which my invention forms a component part; and Fig. 11 is a diagrammatic sketch of the shift pattern associated with the system.

Figure 3:
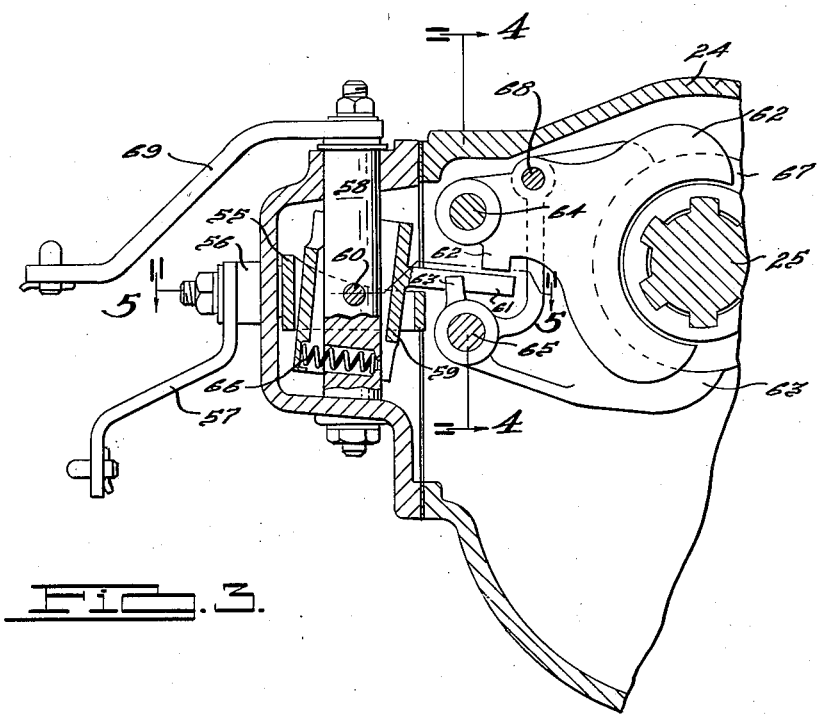
Fig. 3 is a sectional elevation of a portion of the mechanism carried by the transmission housing.

In a motor vehicle, the usual internal combustion engine having a crankshaft 20 driven through fluid coupling 21 and a conventional type of friction main clutch 22 through shaft 23 to a variable speed ratio transmission 24 from which the drive passes from the output shaft 25 to the vehicle rear wheels in the usual manner.

The engine crankshaft 20 carries the vaned fluid coupling impeller 26 which in the well known manner drives the vaned runner 27 whence the drive passes through hub 28 to clutch driving member 29. This member then transmits the drive when clutch 22 is engaged as in Fig. 1, through driven member 30 to the transmission driving shaft 23 carrying the main drive pinion 32. A clutch pedal 33 controls clutch 22 such that when the driver depresses this pedal yoke 34 and collar 35 are thrust forward to cause levers 36 to release the clutch driving pressure plate 37 against springs 38 thereby releasing the drive between runner 27 and shaft 23. The primary function of the main clutch 22 is to enable shifts to be made manually or automatically in transmission 24. The reasons for the use of a fluid coupling are explained in application, Serial No. 661,298 by Carl A. Neracher and Maurice C. Robinson.

Referring to the transmission in Fig. 2 the main drive pinion 32 is in constant mesh with the gear 40 of the countershaft gear cluster mounted for rotation on the countershaft 41. This gear cluster according to well known practice, comprises a low speed gear 42, a second gear 43, and a reverse gear 44 which is in constant mesh with the reverse idler gear 45. The transmission output shaft 25 extends rearwardly to drive the ground wheels of the vehicle.

The driven shaft 25 has mounted thereon the low speed and reverse gear 47 splined to the driven shaft for selective meshing with the countershaft low speed gear 42 or the reverse idler gear 45 for respectively transmitting low speed drive to the driven shaft 25 or the drive thereto in a reverse direction. Freely rotatable on shaft 25 is the second speed gear 48 in constant mesh with the countershaft gear 43 for transmitting a second speed ratio drive. The gear 32 drivingly carries a set of circumferentially spaced external clutch teeth 49. In a similar manner the gear 48 drivingly carries a set of clutch teeth 50.

Splined on the shaft 25 adjacent the forward extremity thereof, is an axially shiftable collar or sleeve 51. Blocker teeth rings 52 and 53 are carried by sleeve 51 and are provided with friction means (not shown) adapted to selectively cooperate with friction means provided with teeth 49 and 50. The blocker teeth rings 52 and 53 are adapted for slight rotation relative to sleeve 51 to facilitate synchronizing of gear speeds prior to clutching of shaft 25 through collar 51 with either gears 32 or 48 in a manner well known in the art.

The transmission is illustrated in its neutral position. To establish the direct or high speed driving connection between shafts 23 and 25, the collar 51 may be shifted axially to the left as viewed in Fig. 2 by the control means hereinafter described to engage the teeth 49 drivingly connected to the gear 32 carried by the driving shaft 23. The collar is drivingly carried by the shaft 25. The second speed driving connection is established by similarly moving the collar 51 to the right as viewed in Fig. 2 to engage teeth 50 carried by gear 48. The first or low speed is obtained by moving gear 47 which is splined to driven shaft 25 forwardly in Fig. 2 into engagement with the countershaft low speed gear 42. The drive then occurs from shaft 23 through main drive pinion 32, countershaft gear 40, countershaft low speed gear 42, gear 47, and driven shaft 25. Reverse drive is obtained by engaging gear 47 with reverse idler gear 45. The transmission mechanism thus described is an embodiment conventionally employed in motor vehicles.

Figure 5:
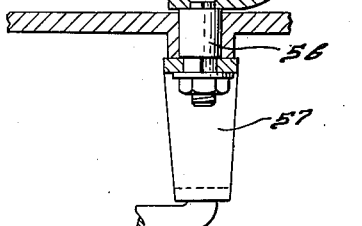
Fig. 5 is a section on the line 5—5 of Fig. 3.

Transmission 24 is provided with control means comprising selector cam 55 keyed to shaft 56 which is keyed to selector lever 57. Rotation of selector lever 57 rotates cam 55, the outward end of cam 55 is lifted by this movement (see Figs. 3 and 5). Control shaft 58 (Fig. 3) is rotatably mounted in the transmission housing. Cylindrical lever 59 surrounds shaft 58 and pin 60 mounted normally to the axis of the shaft fastens the lever to the shaft. Relative axial rotation is prevented by pin 60 but slight rotation of lever 59 on pin 60 is possible. Cylindrical lever 59 is provided with finger 61 adapted to penetrate the openings provided in forks 62 and 63 on shift rails 64 and 65. Spring 66 urges finger 61 to its downward position. Fork 62 engages collar 67 on low speed and reverse gear 47. Fork 63 engages collar 51 for selecting second or direct transmission drive. Gear shift fork guide rail 68 supports the weight of forks 62 and 63. As illustrated in Fig. 3, finger 61 is normally in engagement with the fork 63 on the second speed and direct drive shift rail.

In operation, finger 61 is lifted or lowered to select the fork 62 or 63 which finger 61 is to move. Rotation of shaft 58, cylindrical lever 59, and finger 61 moves the selected shift rail, fork, and collar to the left or right in Fig. 2 depending upon the direction of rotation of shaft 58. Lever 69 is provided and keyed to shaft 58 to rotate the latter.

Manual means are provided in the apparatus illustrated in Fig. 10 for the operation of the clutch and control of the transmission speed ratio drive. The clutch pedal 33 is rotatably mounted at 70 on a shaft, not shown. An extension 33' of clutch pedal 33 depends below rotatable mounting 70 and has fixed thereto a pin 71. A torque shaft 72 has one end thereof rotatably mounted on the vehicle frame, not shown, and the other end rotatably mounted adjacent the engine block, not shown, in a manner well known in the art. A collar 77 keyed to shaft 72 is provided with depending arm 78. A rod 79 operatively connects arm 78 with pin 71. A slot 80 provided in rod 79 permits relative movement in one direction between rod 79 and pin 71. A collar 73 is keyed to torque shaft 72. Collar 73 is provided with a depending arm 74. A rod 75 connects arm 74 with clutch throwout fork 76 which is pivoted at 76'. Clutch throwout fork 76 engages collar 34. It will thus be seen that depression of clutch pedal 33 rotates extension 33' about rotatable mounting 70 and through pin 71 retracts rod 79 and rotates arm 78, shaft 72, collar 73, and arm 74 to push a rod 75 and rotate clutch throwout fork 76 about its pivotal mounting 76' thereby moving collar 34 and disengaging the clutch 22.

Figure 4:
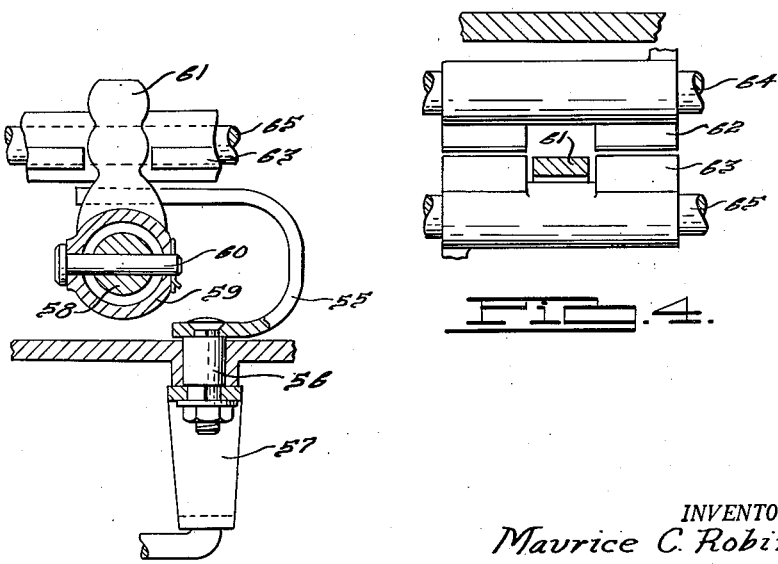
Fig. 4 is a section on the line 4—4 of Fig. 3.

A manual shift control rod 82 is shown in Fig. 10 as supported on the steering column housing 83 by bracket 84. The manual shift control rod 82 is slidably mounted in the bracket 84 and adapted for both axial and rotary movement. As is usual in the art, the axial movement is adapted to select the transmission shift rail 64 or 65 which is to be moved by finger 61 (Fig. 4), and rotation of the shift control rod 82 slides the shift rail in one of two directions (depending upon the direction of rod rotation) through the rotation of shaft 58 (Fig. 3) as described above. This effects the desired transmission speed ratio drive connection. A pair of spaced circumferential collars 85 and 86 located adjacent the base of rod 82 and operatively connected thereto receive therebetween the end of a lever 87 which is rotatably mounted at 31 adjacent its mid portion to the bracket 84. A rod 88 connects lever 87 with transmission selector lever 57. Axial movement of rod 82 is transmitted through this linkage to the selector lever 57.

An arm 89 is operatively connected to rod 82. A depending rod 92 connects arm 89 with a rotatable lever 93 mounted on shaft 94. An arm 95 of lever 93 is connected to transmission shift lever 69 through rod 96. Rotation of rod 82 through the linkage just described rotates shift lever 69 and shaft 58 (Fig. 3) for manual transmission control.

In Fig. 10 automatic means have been superimposed on the manual controls just described. The automatic means to be described is adapted to actuate both clutch and transmission. Referring to Fig. 10 an airtight housing 106 containing a cylinder 107 has a tubular connection 108 with the engine intake manifold. A solenoid valve 109 is adapted to selectively open and close this connection and vent cylinder 107. A piston 110 is slidably mounted in cylinder 107 and a spring 111 acting on piston 110 and reacting on housing 106 urges piston 110 to one end of cylinder 107. Manifold low pressure or vacuum as it is commonly referred to, overcomes spring 111 when valve 109 is open. Piston rod 112 connects the piston 110 with an arm 113 carried by a collar 114 rotatably mounted on torque shaft 72. The collar 77 previously referred to is provided with an extension 115 adapted to be engaged by the arm 113 when the latter is rotated in a counterclockwise direction. When cylinder 107 is connected with the manifold through valve 109 and tubular passage 108, piston 110 is raised and piston rod 112 rotates arm 113 in a counterclockwise direction. Arm 113 engages and carries therewith the extension 115 of collar 77 thereby rotating the collar. The collar 77 is keyed to the torque shaft 72 and the torque shaft 72 is thus rotated. Rotation of the shaft 72 rotates the collar 73 keyed thereto and the depending arm 74 pushes rod 75, rotates clutch throwout fork 76, and disengages the clutch 22. The rotation of the collar 77 and depending arm 78 in this counterclockwise direction does not cause a depression of the clutch pedal 33 because of the cooperation of the slot 80 in rod 79 and the pin 71. This pin and slot combination permits movement of rod 79 to the right in Fig. 8 without an accompanying depression of clutch pedal 33. When valve 109 closes cylinder 107 to the manifold and vents the cylinder, spring 111 returns the parts described to their original position permitting the clutch to reengage.

The movement of piston 110 also effects changes in transmission speed ratio drive by the movement of transmission collar 51 illustrated in Fig. 2. The automatic apparatus herein effects changes of speed ratio drive between a relatively slow drive of the driven wheels and a relatively fast drive or between second and direct drive as particularly described in relation to the Fig. 2 transmission. The torque shaft 72 is provided with a collar 116 which is rotatably mounted thereon. An arm 117 is carried by collar 116. The arm 117 is designed to actuate a device referred to as an alternator and generally designated by the numeral 118. Alternator 118 is adapted to translate successive counterclockwise rotations of arm 117 to alternate counterclockwise and clockwise rotation of transmission shaft 58 (Fig. 3). Referring to the alternator in Fig. 10, a support plate 119 is secured to a stationary object. A pin 120 projects from the surface of plate 119. A pair of upwardly extending fingers 121 and 122 are rotatably mounted on a lever 123 on opposite sides of its fulcrum 123'. Spring 124 connects fingers 121 and 122 and urges them toward each other. The fingers 121 and 122 each have a recessed portion with a shoulder 125 adjacent the upper end thereof. A bifurcated lever 126 is rotatably connected to arm 117 and has a pin 127 protruding from each fork thereof. The pins 127 are adapted to selectively engage the shoulders 125 of fingers 121 and 122. A pair of pins 128 and 129 guide the fingers and cooperate with the arcuate paths of the connections of the fingers with lever 123 to direct the shoulder 125 portion of the fingers toward the pin 120 when the finger occupies its highest position in Fig. 10. A link 130 and bellcrank 131 transmit motion of lever 123 to a rod 132. In the alternator with the parts in the position shown in Fig. 10, downward motion of arm 117 will pull lever 126 downwardly and one pin 127 will push finger 121 downwardly thereby rotating lever 123 in a counterclockwise direction about fulcrum 123', raising link 130, rotating bellcrank 131, and pulling rod 132 to the left. With lever 123 in this position finger 122 has been raised and the portion thereof connected to lever 123 has been swung outwardly on an arc about the fulcrum 123' with the spring 124 urging the upper portion thereof to the left as far as pin 129 will permit in Fig. 10. When arm 117 is raised the bifurcated lever 126 is centered by the cam action of pin 120 in the crotch thereof so that on its next downward movement the other pin 127 engages shoulder 125 of finger 122 to reverse the movement described above and to thereby push on rod 132. Through this mechanism each successive downward motion of arm 117 reverses the movement of rod 132. The arm 117 is rotated in a counterclockwise direction to initiate the movements described above each time the piston 110 is actuated by the connection of cylinder 107 with the manifold vacuum. As the cylinder is raised in Fig. 10 by the manifold vacuum and the piston rod 112 rotates the arm 113 in a counterclockwise direction the collar 114 is rotated in a counterclockwise direction. The collar 114 and the collar 116 are each rotatably mounted on torque shaft 72 and have arms 133 and 134 extending therefrom. A spring 135 connects arms 133 and 134. Therefore, the rotation of the collar 114 stretches spring 135 which in turn rotates the collar 116 and the arm 117 in order that the alternator 118 may be actuated as described above.

The rod 132 is alternately pushed and pulled by the alternator 118 and is connected to an extended portion 140 of the rotatable lever 93 so that motion of rod 132 through the lever 93 actuates the rod 96 previously described as connected to the transmission shift lever 69. Thus each successive upward movement of piston 110 induces a motion of shift lever 69. These successive motions alternate between clockwise and counterclockwise rotation of the shaft 58. The spring 66 in Fig. 3 urges the finger 61 into engagement with the shift rail 65 at all times when the selector lever 57 is not actuated. During automatic control the selector lever 57 is not actuated. Therefore, the successive clockwise and counterclockwise motions of shift lever 69 cause the shift rail 65 to move alternately to the left and to the right in Fig. 2 thereby moving the collar 51 to the left and to the right and causing alternate drives to occur in second speed or direct drive in the transmission of Fig. 2. The spring 135 is adapted to store force transmitted thereto by piston 110 until the blocker teeth 52 are able to utilize the force to effect a change in transmission speed ratio drive.

Carburetor throttle lever 150 is controlled by accelerator pedal 151 through conventional linkage illustrated in Fig. 10. Rod 152 connected to accelerator pedal 151 has its other end connected to lever 153 keyed to rotatably mounted shaft 154. A lever 155 is also keyed to shaft 154 for rotation therewith and rod 156 connects lever 155 with throttle lever 150. Thus actuation of accelerator pedal 151 through rod 152, lever 153, rod 154, lever 155, and rod 156 rotates throttle lever 150.

Means to control the actuation of the piston 110 is illustrated in Fig. 10. A grounded source 160 of electric energy is connected through ignition switch 161 to a transmission control element in the form of a switch 97 by electrical conductor 162. Switch 97 is adapted to be closed when the shift control rod 82 is placed in a predetermined position to be described herein. Electrical line 163 connects switch 97 with a switch 164 adapted to be closed when the throttle is substantially closed. Line 165 connects switch 164 with a two-way shift rail switch 166 having a finger 167 thereon adapted to be engaged by abutments on an extension 168 of the transmission shift rail 65. A first circuit in switch 166 is disconnected and a second circuit is connected when the shift rail has completed its movement. This switch movement alternates with each transmission speed ratio change on the shift rail 65. A vehicle speed responsive governor 169 has one outlet terminal 170 and two inlet terminals 171 and 172 and is adapted to connect the outlet terminal with one inlet terminal below a predetermined speed and with the other inlet terminal above the predetermined speed. Each inlet terminal is connected to one of the circuits referred to for switch 166. Line 173 connects governor terminal 170 with solenoid valve 109 in manifold line 108. Line 174 grounds the circuit. Valve 109 is adapted to connect cylinder 107 with the manifold line 108 when energized and to close line 108 and vent cylinder 107 to atmosphere when not energized. In the operation of the apparatus thus far described when the driver closes switch 97 to select automatic drive and then closes the throttle lever 151 above a predetermined vehicle speed, valve 109 is energized to admit vacuum to cylinder 107. Piston 110 is raised and clutch 22 disengaged through the linkage 112, 113, 115, shaft 72, collar 73, rod 75, and clutch throwout fork 76. This motion of the piston also causes a delayed movement of transmission shift lever 69 and shift rail 65 through arm 113, collar 114, arm 133, spring 135, collar 116, arm 117, alternator 118, rod 132, lever 93, and rod 96. The change in speed ratio drive caused by moving shift lever 69 moves the shift rail 65 and its extension 168 breaks the circuit at switch 166 thereby deenergizing solenoid valve 109 and permitting spring 111 to move piston 110 to the lower end of the cylinder permitting the clutch to reengage. The switch 166 is now connected with its other circuit and a complete electrical circuit will be made when the governor 169 connects the outlet terminal 170 with the other inlet terminal below a predetermined vehicle speed and the driver closes the throttle switch 164 by releasing accelerator pedal 151. The electrical circuit then being complete the solenoid valve 109 is energized and the piston 110 raised to repeat the process. The alternator 118 will this time move the transmission shift lever 69 in the reverse direction from that previously experienced. The shift rail 65 will be moved and the collar 51 moved to cause a second speed drive in the Fig. 2 transmission. A dashpot 180 mounted upon a stationary object and having its piston rod 183 connected to the arm 134 of torque shaft collar 116 may be used to dampen the movements imparted to the transmission collar 51 by the piston 110. When the vacuum cylinder piston rod 112 rotates arm 113 and through spring 135 rotates the collar 116 to actuate the alternator 118 and transmission collar 51, the spring 135 permits variations to occur between the piston movement and alternator or transmission collar movement. The dashpot 180 assures that such variation will occur to the end that the transmission collar 51 is moved at a relatively slow speed while the vacuum cylinder piston is moved relatively rapidly. The dashpot 180 has been so positioned that manual actuation of the transmission collar 51 through the shift control rod 82 and transmission shift lever 69 are independent of the dashpot. The automatic control means depends for actuation upon the closing of a switch 97 provided adjacent the lower portion of rod 82 and it also depends upon the deactivation of manual control rod 82. Figs. 6, 7, 8, and 9 illustrate a mechanism by which this is accomplished. The rod 82 is supported by two collars 200 and 201 formed of friction material to dampen vibration and permit rotary and axial movement of rod 82. Collar 200 is carried by a bracket 202 and collar 201 is carried by a hub portion 203 of arm 89. The hub 203 is urged to the left in Fig. 6 into engagement with bracket 84 by spring 204 which is concentric with rod 82 and reacts against bracket 202. The hub 203 is supported by collar 205 of bracket 84. Switch 97 is supported adjacent the base of rod 82 and has a plunger 206 positioned so that it is adapted to be engaged by the end of rod 82 when the latter is moved axially to the left in Fig. 6. Axial movement of plunger 206 to the left in Fig. 6 closes switch 97 in a manner well known in the art. A spring (not shown) urges plunger 206 to the right in Fig. 6 to open the switch 97.

A hub 207 is concentric with rod 82 and retained thereon by nuts 208. The hub 207 is splined to rod 82 at 209. The hub 207 carries the spaced circumferential collars 85 and 86 previously referred to as actuating the lever 87 and rod 88 by axial movement of rod 82 for manual control of the transmission. The hub 207 is provided with a pair of axially spaced circumferential grooves 210 and 211 in its exterior surface. These grooves are separated by a ridge 212. The bracket 84 is provided with a pair of diametrically opposed radial holes 213 and 214. Each hole contains a spring 215 and a ball detent 216. Each spring urges one of the ball detents radially inward into a groove 210 or 211. The ball detents during manual control of the transmission are positioned in the groove 210 and permit a limited unrestricted axial movement of the rod 82 across the neutral range illustrated in the Fig. 11 diagrammatic view of the shift pattern. This axial movement is insufficient to close switch 97.

The hub 207 and hub 203 are provided with cooperating axial teeth 217 and slots 218 which constitute normally engaged clutch components. During manual operation, rotation of rod 82 rotates hub 207 through splines 209 and this rotation of hub 207 is transmitted to hub 203 and arm 89 through the cooperation of teeth 217 and slots 218. Thus axial movement of rod 82 is transmitted to lever 87 and rotation of rod 82 is transmitted to arm 89 to effect manual control of the transmission speed ratio drive.

The shift control rod 82 is mounted for conventional movement in an axial direction between limits in the predetermined path usually referred to as neutral. At one of these axial limits there is a position from which the rod may be rotated to a station corresponding to the reverse position illustrated in the Fig. 11 shift pattern. The rod 82 may be rotated from the neutral position at the other limit to a station designated by the word "second" in Fig. 11. When the driver wishes to activate the automatic apparatus described herein this may be accomplished by moving the usual hand lever 220 provided on rod 82 into the second speed position and then forcing rod 82 downward or in an axial direction beyond the axial limit containing the second speed position as illustrated in Fig. 11. The additional downward or axial motion of rod 82 closes switch 97 and operatively disconnects arm 89 from rod 82 by disengaging clutch components 217 and 218. The additional downward motion causes the ball detents to ride over the ridge 212 and locate in the groove 211. Means are provided to assure that the hand lever 220 and rod 82 will be in the second speed position before the additional downward motion of rod 82 will be permitted. The hub 207 forms a blocking device or element and is provided with a slot 221 which extends parallel to the axis of the rod 82. The bracket 84 carries a pin 222 which forms a coacting blocking device and is stationary. The pin 222 and slot 221 are so positioned that they are aligned when the rod 82 and hub 207 are rotated to second speed position. When the pin and slot are aligned the additional downward movement of rod 82 is permitted by the entrance of the pin in the slot 221. When the pin and slot are not aligned, the downward movement of rod 82 is resisted by engagement of the hub 207 with pin 222.

Blocking means are provided to insure that it will be impossible for a driver to align the pin 222 with slot 221 when the rod 82 is raised and approaching its reverse position and while they are aligned to force the rod 82 down to the automatic position. The circumferential collar 86 of hub 207 constitutes a blocking device or element and is provided with a slot 223. A pin 224 which is secured to bracket 84 serves as a coacting blocking device. The pin 224 and slot 223 are so positioned that they are aligned when the rod 82 and hand lever 229 are in their neutral position. The pin 224 is located above the collar 86 in the second and high speed positions and located below the collar 86 in the reverse and low speed positions of rod 82. Thus when the driver lifts rod 82 to move it axially to the upper limit on left side of the pattern in Fig. 11 the collar 86 passes over the pin 224 and when the rod 82 is then rotated to either reverse or low speed positions the collar 86 rotates and disaligns the slot 223 and pin 224. Then downward movement of rod 82 is obstructed by pin 224 engaging collar 86.

The downward movement of rod 82 into automatic position causes rod 82 to engage plunger 206 and close switch 97. In addition, a shoulder 225 on rod 82 engages collar 85 on hub 207 to force the hub to accompany the rod in its downward travel. This movement of collar 85 away from hub 203 which is supported by the stationary bracket 84 causes the slot 218 and teeth 217 to separate thereby declutching arm 89 from rod 82. The arm 89 is then freely rotatable and not operatively connected to rod 82. When arm 89 is moved by the automatic actuation of transmission linkage the motion will not be transmitted to the rod 82. The automatic mechanism does not actuate the selector lever 57 and linkage connected to lever 87 so that a similar problem regarding movement of lever 87 is not present. It should be noted that the additional downward movement of rod 82 required to close switch 97 rotates arm 87 and moves rod 88 and selector lever 57. This is possible because as shown in Fig. 3, the cam 55 is not connected to finger 61 and is capable of unrestricted downward motion. The parts may be returned to their positions effecting manual control by reversing the movements described above.

Features of novelty shown but not claimed herein are more particularly described and claimed in the copending applications, Serial No. 661,298 filed by Neracher et al.; Serial Numbers 687,247, 698,451 and 755,661 filed by Otto W. Schotz, now Patent No. 2,487,482, issued November 8, 1949 and Serial No. 694,084 filed by C. A. Neracher, now Patent No. 2,528,772, issued November 7, 1950.

I claim:

1. In a shift control mechanism for a vehicle transmission, an inclined rotary and axially movable shift control rod, said rod being normally operable in a predetermined axial path between first and second limits and operable in a predetermined rotary path at one of said limits to a first station and operable in a predetermined rotary path at the other of said limits to a second station, a transmission control element operable by axial movement of said rod beyond said second limit, a first blocking device carried by the lower portion of said rod and a coacting blocking device located adjacent said rod, one of said blocking devices being provided with a slot shaped to accommodate passage of the other of said blocking devices therethrough when said rod is moved axially from the second station to thereby accommodate movement of said rod beyond said second limit from said second station to operate said transmission control element and means carried by the lower portion of said rod and coacting means adjacent said rod for blocking axial movement of said rod from said first limit toward said second limit until said rod is rotated for movement in said axial path.

2. In a control mechanism for a motor vehicle having an engine and a transmission operable to provide a plurality of speed ratio drives from the engine to the vehicle driving wheels; an inclined rotary shift control rod operable for axial movement between first and second limits determining first and second positions and being rotatable from said first position to a first station and being rotatable from said second position to a second station, means providing an operative connection of said shift control rod with said transmission for establishing certain of said speed ratio drives when said rod is operated to said first and second stations, automatic means including an electric circuit operable to effect a change in speed ratio drive in said transmission, said automatic means including a normally open switch positioned to be closed by axial movement of said rod beyond said second limit to thereby render said automatic means operative, first blocking means located adjacent the lower portion of said rod and including a stationary element and an element movable with said shift control rod, one of said elements being provided with a slot shaped to accommodate passage of the other of said elements therethrough when said rod is moved axially to close said switch while in the predetermined rotary position corresponding to said second station, and second blocking means including a stationary element and an element movable with said shift control rod, one of said last-mentioned elements being provided with a slot shaped to accommodate passage of the other of said last-mentioned elements during movement of said rod between said second and first positions, said second blocking means being operable to block axial movement of said rod directly from said first station to said second station.

3. In a control mechanism for a motor vehicle having an engine and a transmission operable to provide a plurality of speed ratio drives from the engine to the vehicle driving wheels, an inclined rotary shift control rod operable for axial movement between first and second limits determining first and second positions and being rotatable from said first position to a first station and being rotatable from said second position to a second station, apparatus providing an operative connection of said shift control rod with said transmission for establishing certain of said speed ratio drives when said rod is operated to said first and second stations, automatic means including an electric circuit operable to effect a change in said speed ratio drive in said transmission, said automatic means including a normally open switch positioned to be closed by axial movement of said rod beyond said second limit to thereby render said automatic means operative, said apparatus including normally engaged clutch components adapted to be disengaged by axial movement of said rod beyond said second limit to operatively disconnect said rod from operative connection to said transmission, first blocking means including a stationary element and an element on said shift control rod, one of said elements being provided with a slot shaped to accommodate passage of the other of said elements therethrough when said rod is moved axially to close said switch and disengage said clutch components while in the predetermined rotary position corresponding to said second station, and second blocking means including a stationary element and an element movable with said shift control rod, one of said last-mentioned elements being provided with a slot shaped to accommodate passage of the other of said last-mentioned elements during movement of said rod between said second and first positions, said second blocking means being operable to block axial movement of said rod directly from said first station to said second station.

MAURICE C. ROBINSON.

REFERENCES CITED

The following references are of record in the file of this patent:

UNITED STATES PATENTS

| Number | Name | Date |
|---|---|---|
| 2,287,272 | Price | June 23, 1942 |
| 2,292,633 | Griswold | Aug. 11, 1942 |
| 2,329,724 | Maurer | Sept. 21, 1943 |
| 2,365,732 | Snow | Dec. 26, 1944 |
| 2,374,303 | Osborne | Apr. 24, 1945 |
| 2,426,234 | Neracher | Aug. 26, 1947 |
| 2,443,228 | Cornelius | June 15, 1948 |